United States Patent [19]

Glassburn

[11] Patent Number: 5,317,713
[45] Date of Patent: May 31, 1994

[54] MICRO-WINCHESTER DISK DRIVE HAVING ON-BOARD SEGMENTED CACHE MEMORY

[75] Inventor: Tim R. Glassburn, Milpitas, Calif.

[73] Assignee: Quantum Corporation, Milpitas, Calif.

[21] Appl. No.: 762,683

[22] Filed: Sep. 19, 1991

[51] Int. Cl.⁵ .............................................. G06F 13/00
[52] U.S. Cl. ................................................... 395/425
[58] Field of Search ................................ 395/400, 425

[56] References Cited

U.S. PATENT DOCUMENTS

| | | | |
|---|---|---|---|
| 3,881,184 | 4/1975 | Koepcke et al. | 369/32 |
| 4,135,217 | 1/1979 | Jacques et al. | 360/77.04 |
| 4,371,929 | 2/1983 | Braun et al. | 364/200 |
| 4,419,701 | 12/1983 | Harrison et al. | 360/77.08 |
| 4,530,020 | 7/1985 | Sutton | 360/77.04 |
| 4,583,166 | 4/1986 | Hartung et al. | 395/425 |
| 4,593,354 | 6/1986 | Ushiro | 364/200 |
| 4,637,024 | 1/1987 | Dixon et al. | 364/200 |
| 4,675,652 | 6/1987 | Machado | 341/59 |
| 4,730,321 | 3/1988 | Machado | 371/37.5 |
| 4,772,974 | 9/1988 | Moon et al. | 360/78.04 |
| 4,835,686 | 5/1989 | Furuya et al. | 395/425 |
| 4,870,565 | 9/1989 | Yamamoto et al. | 364/200 |
| 4,905,141 | 2/1990 | Brenza | 364/200 |
| 4,965,684 | 10/1990 | Stefansky | 360/78.12 |
| 5,005,089 | 4/1991 | Thanos et al. | 360/77.08 |
| 5,091,909 | 2/1992 | Kishiro et al. | 364/DIG. 1 |

OTHER PUBLICATIONS

Data Sheet, SSI 32 F8011, Programmable Electronic Filter, Silicon Systems Inc. ©Jul. 1990.
Data Sheet, Prodrive LPS 52/105 SCSI/AT, Quantum Corporation ©89, 90, 91.

Primary Examiner—David L. Robertson
Attorney, Agent, or Firm—David B. Harrison

[57] ABSTRACT

A high capacity micro-Winchester disk drive is capable of storing approximately 120 megabytes of user data on each storage disk. A digital bus interface connects to data, control and status lines from a host computer, and a cache memory defines a plurality of programmable memory segments for disk data, host data and microcontroller data. The cache memory controller enables read-ahead, write-ahead, and automatic multiple block read and write operations to occur between the disk drive and the host without intervention of the disk drive's embedded microcontroller.

4 Claims, 8 Drawing Sheets

Microfiche Appendix Included
(2 Microfiche, 126 Pages)

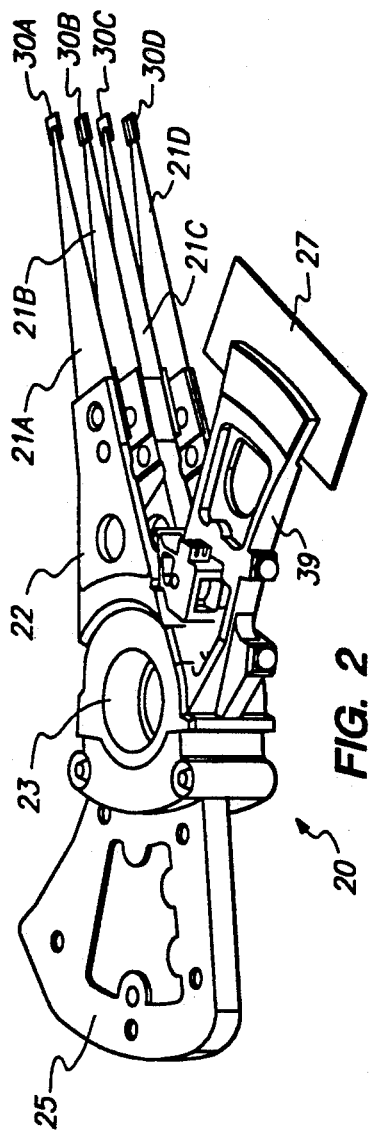
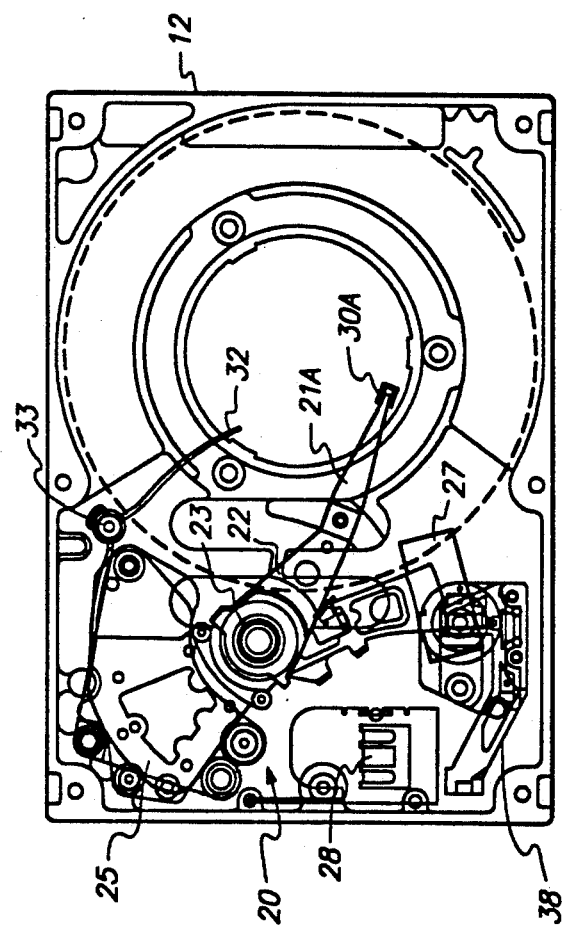

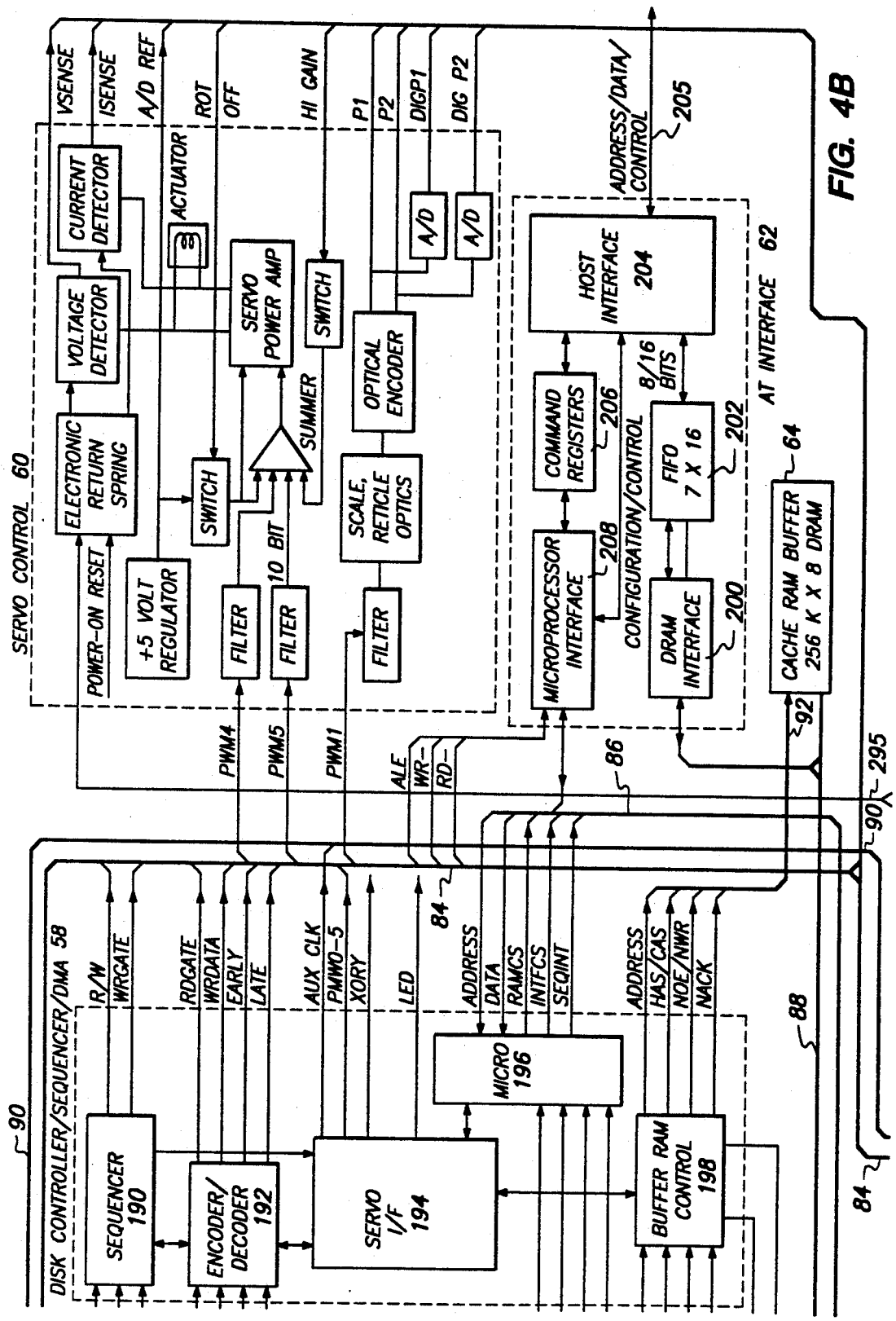

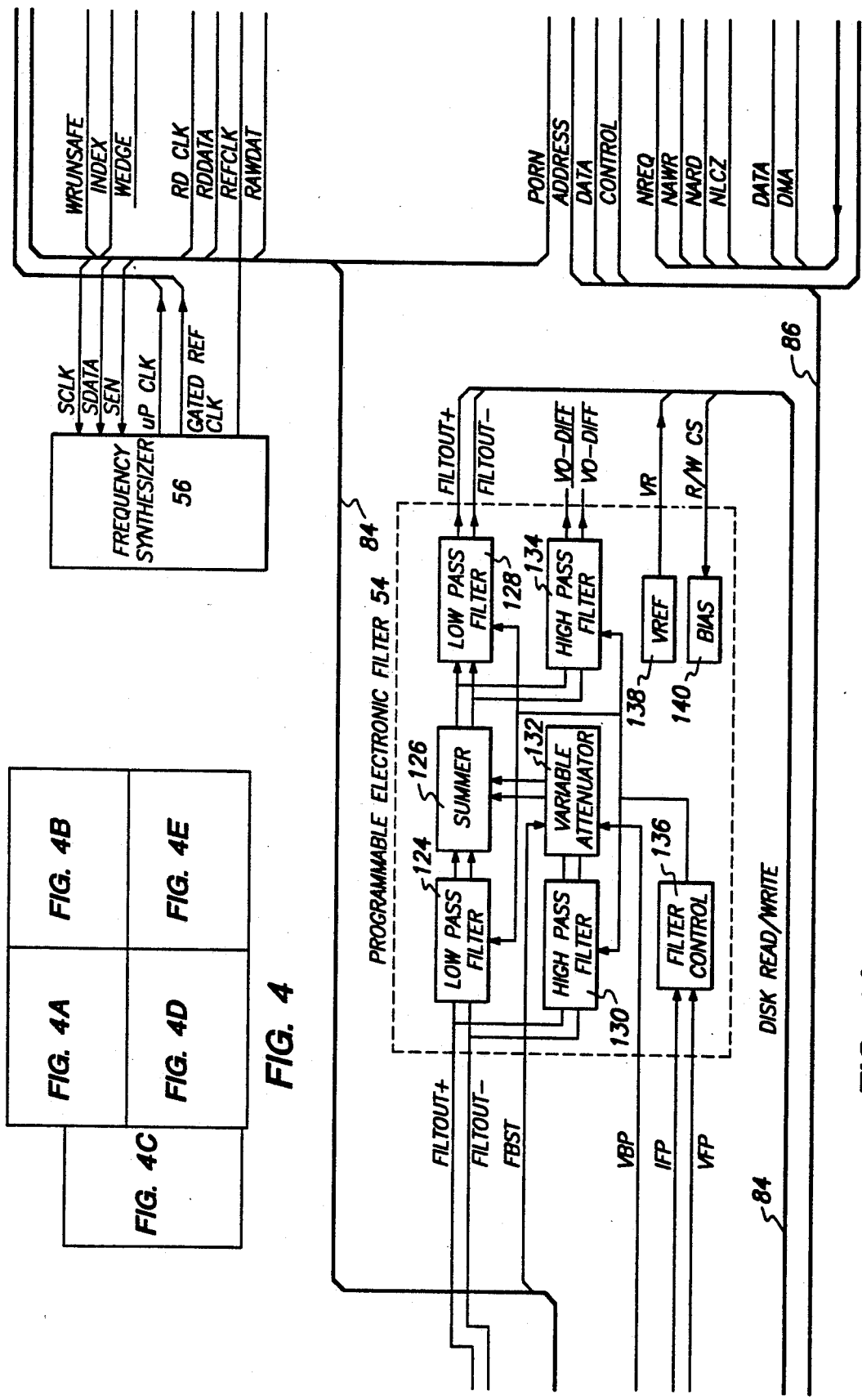

MICRO-WINCHESTER DISK DRIVE HAVING ON-BOARD SEGMENTED CACHE MEMORY

REFERENCE TO MICROFICHE APPENDIX

A microfiche appendix accompanies the application leading to the grant of this patent, setting forth a software control program, and specifications of certain application specific integrated circuits as well as detailed circuit schematic diagrams of a preferred embodiment of the disk drive.

FIELD OF THE INVENTION

The present invention relates to disk drives. More particularly, the present invention relates to an improved, low height profile, high capacity micro-Winchester disk drive.

REFERENCE TO RELATED PATENTS AND APPLICATIONS

The following commonly assigned patents and applications are related to the present invention, and the respective disclosures thereof are hereby incorporated by reference herein.

U.S. Pat. No. 4,772,974 to Moon et al., entitled "Compact Head and Disk Assembly".

U.S. Pat. No. 5,005,089 to Thanos et al., entitled "High Performance, High Capacity Micro-Winchester Disk Drive".

U.S. Pat. No. 4,675,652 to Machado, entitled "Integrated Encoder Decoder for Variable Length, Zero Run Length Limited Codes".

U.S. Pat. No. 4,730,321 to Machado, entitled "Disk Drive with Improved Error Correction Code".

U.S. patent application Ser. No. 07/541,838 of Lee, filed on Jun. 21, 1990, entitled "Thermal Compensated Head Positioner Servo for a Disk Drive", now U.S. Pat. No. 5,128,813.

U.S. patent application Ser. No. 07/650,791 of Peterson et al., filed on Feb. 1, 1991, entitled "On-The-Fly Error Correction with Embedded Digital Controller", now U.S. Pat. No. 5,241,546.

U.S. patent application Ser. No. 07/710,065 of Gold, filed on Jun. 4, 1991, entitled "Fault Tolerant RLL Data Sector Address Mark Decoder", now U.S. Pat. No. 5,231,545.

U.S. patent application Ser. No. 07/710,861 of Machado et al., filed on Jun. 4, 1991, entitled "Miniature Disk Drive Having Embedded Sector Servo with Split Data Fields and Automatic On-The-Fly Data Block Sequencing".

U.S. patent application Ser. No. 07/710,171 of Machado et al., filed on Jun. 4, 1991, entitled "Miniature Fixed Disk Drive", now U.S. Pat. No. 5,255,136.

U.S. patent application Ser. No. 07/762,887 of Jeppson et al., filed on Sep. 19, 1991, entitled "Servo Pause for Disk Drive Embedded Controller".

BACKGROUND OF THE INVENTION

Low profile micro-Winchester disk drives are known. In addition to the related patents listed above, a representative low profile disk design is disclosed in U.S. Pat. No. 4,965,684 to Stefansky, entitled "Low Height Disk Drive". The architecture employed in the Stefansky patent employed "embedded servo" head positioning techniques wherein a multiplicity of embedded servo sectors provided, inter alia, head positioning information to the head positioner structure. The obvious drawback of the embedded sector approach is the overhead associated with the multiple servo sectors, an overhead which limits the overall data storage capacity of the disk drive.

One known way of avoiding the overhead associated with embedded servo sectors is to include an optical encoder for providing coarse head positioning information to the head positioner structure. This technique is followed in the teachings of the referenced U.S. Pat. Nos. 4,772,974 and 5,005,089, noted above. Improvements described in the referenced U.S. patent application Ser. No. 07/556,945 of Thanos et al, filed on Jul. 20, 1990, entitled "Head Position Recalibration for Disk Drive", now U.S. Pat. No. 5,227,930, enabled a low profile (one inch high) micro-Winchester disk drive employing an optical encoder to achieve a data storage capacity of approximately 52 megabytes of user data per data storage disk.

While the approach set forth in related U.S. Pat. No. 5,227,930 worked well, and has been very successful commercially, a hitherto need has remained to improve the capacity and performance of the disk drive described therein, so that as much as 120 megabytes of data may be stored on both sides of a micro-Winchester data storage disk, and so that practical access times to the vastly expanded data capacity are reduced.

SUMMARY OF THE INVENTION

An object of the present invention is to provide a cache buffer memory and multi-channel controller architecture in which segments may be separately and effectively simultaneously accessed, thereby facilitating and enabling automatic writes from an interface to the cache memory in one segment while read operations from another segment to disk are occurring, and conversely.

As one aspect of the present invention, a high capacity miniature disk file comprises:

a housing defining a form factor having a length dimension, a width dimension, and an overall height dimension, and wherein the height dimension is not greater than approximately one inch, two disks commonly mounted to a spindle for rotation, at least one of the disks comprising a data storage disk having two data storage surfaces defining a series of concentric zones, each zone including a multiplicity of concentric data storage tracks for storing coded data at a data transfer rate set in relation to its radius on the disk, so that each disk stores approximately 120 megabytes of formatted user data, for example, a direct drive brushless spindle motor mounted to the housing for rotating the spindle at a substantially constant angular velocity, a spindle motor driver for driving the brushless spindle motor, a voice coil rotary actuator mounted to the housing and supporting and positioning a data transducer head relative to each said data storage surface, at least one spindle runout providing pattern prerecorded on a said data storage surface and readable by the head at least at spaced angular increments of a revolution of the disk, track centerline correction data prerecorded on a said data storage surface and readable by the head for enabling track centerline correction for each data track, a read channel circuit connected to the head for detecting stored data values including runout-providing signals read during passage of the head over the runout providing pattern and for detecting centerline correcting signals read during passage of the head over the track centerline correction data, an optical position encoder coupled between the voice coil rotary actuator and the housing for generating at least two optical phase signals P1 and P2 with movement of the actuator relative to the housing, the phase signals having a predetermined fixed angular relationship there between, an analog to digital converter selectively connected to convert the runout-providing signals, the centerline correcting signals, and the at least two optical phase signals P1 and P2 into digital values, a random access control memory for storing control data comprising the digitized runout-providing signals, the centerline correcting signals, and the at least two optical phase signals, a cache memory for temporarily storing data blocks, a data sequencer for sequencing data blocks to and from the data storage surface, a digital interface circuit for receiving digital data and digital control values from a host computing system appropriate to control data storage and retrieval operations of the disk drive subsystem, a cache memory controller responsive to the interface circuit and to the data sequencer for controlling temporary storage of data blocks in the cache memory, a programmed digital controller connected to the digital interface circuit and to the control memory for receiving control values from the host computing system, and for processing the control data, to provide digital head positioning values during track seeking, settling and following operations of the rotary actuator, a digital to analog converter for converting the head positioning values into analog head position controls, an actuator driver connected to operate the actuator in accordance with the analog head position controls received from the digital to analog converter, and a printed circuit board including interconnected electronic elements comprising at least the read channel, the analog to digital converter, the control memory, the cache memory, the data sequencer, the digital interface circuit, the cache memory controller, the programmed digital processor, and the digital to analog converter, the printed circuit board being secured to the housing and lying entirely within the form factor defined by the housing.

In an aspect directly related to improving data transfer rates, the digital interface circuit and the cache memory controller include automatic read and write circuitry for automatic successive reading and writing of data blocks between the host computing system and the cache memory. As a related aspect, the cache memory is arranged into a plurality of segments or banks, including a disk and microcontroller bank, a host write bank, and a host read bank, and the cache memory controller includes bank selection circuitry for selecting between the banks on a cyclic basis, so that transfers between cache and disk may be carried out during one portion of a memory cycle, and so that transfers between the host and cache may be carried out during another portion of the memory cycle.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 2 is an enlarged, isometric view of a mass-reduced rotary actuator structure of the FIG. 1 disk drive.

FIG. 3 is an approximately full size, diagrammatic top plan view showing assembly of some of the elements of the FIG. 1 disk drive.

FIGS. 4A, 4B, 4C, 4D and 4E together provide a detailed block diagram of the electronics portion of the FIG. 1 disk drive, FIG. 4 is a layout plan showing the relative arrangement of FIGS. 4A, 4B, 4C, 4D and 4E to form the single diagram.

DETAILED DESCRIPTION OF A PREFERRED EMBODIMENT

Overview of Disk Drive 10

Figure 1:
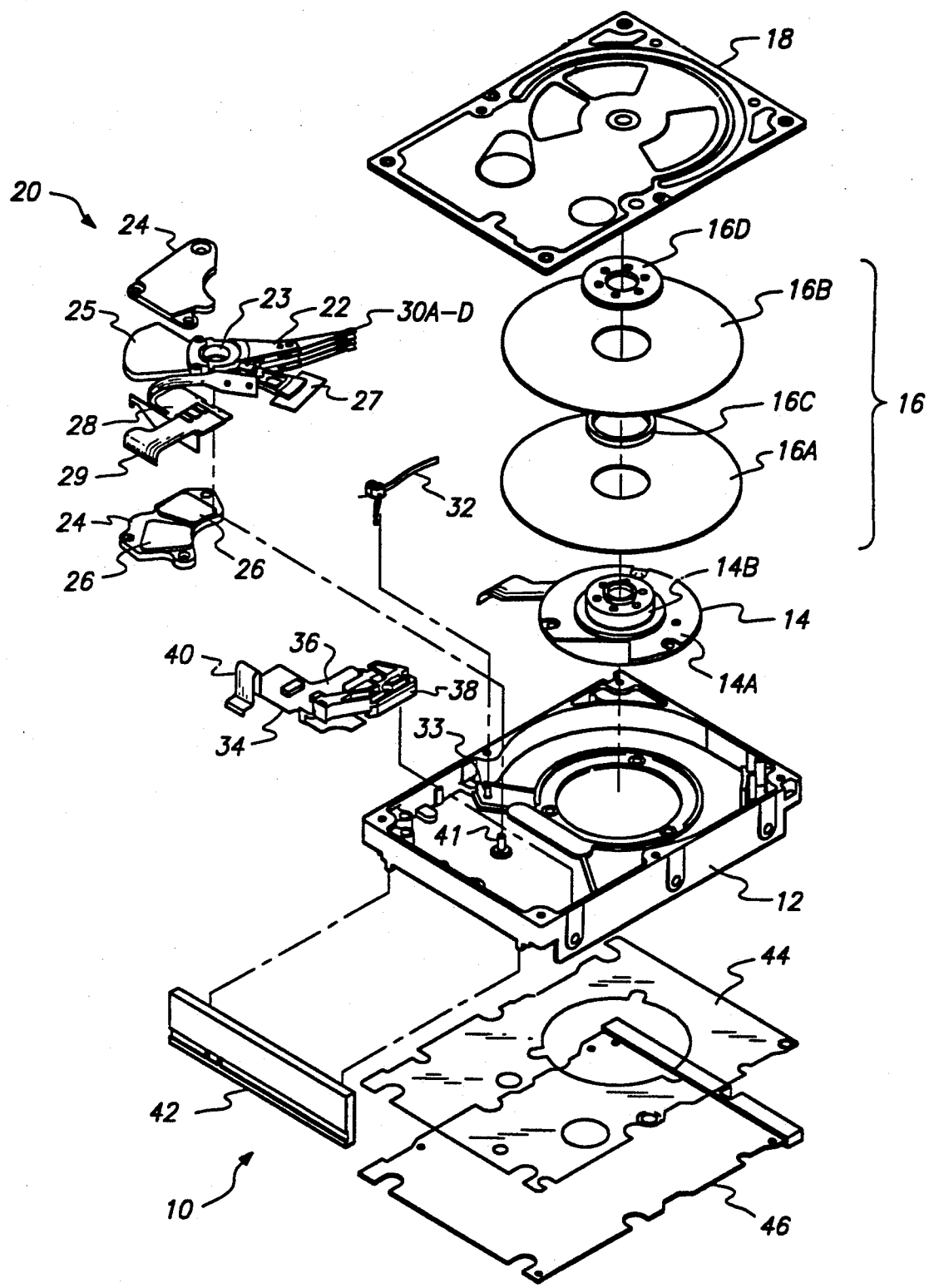
FIG. 1 is an exploded isometric view of a head and disk assembly of a low profile micro-Winchester disk drive subsystem incorporating the principles of the present invention.

Turning to FIG. 1, a disk drive 10 incorporating principles of the present invention includes a base casting assembly 12 preferably formed by injecting aluminum alloy in molten state into a suitable mold. The resultant base structure includes a main bottom wall and four integral sidewall portions extending about the periphery of the main bottom wall, substantially as shown in FIG. 1.

A DC brushless spindle motor 14, preferably including Hall sensors for marking rotational position for three-phase commutation and for a once-per-revolution index marker, includes a fixed flange 14A which is mounted in a recess formed in the base casting assembly 12, e.g. by screws. The flange 14A supports a central shielded fixed shaft and bearing assembly to which a rotating spindle hub 14B is rotatably secured. A ferrofluid seal adjacent to an upper end of the shielded fixed shaft seals the interior space within the housing 12 from the bearings and bearing lubricant of the spindle assembly. A fixed stator assembly includes a stator assembly having polyphase coils and a laminar core structure defining plural magnetic poles. The rotating hub 14B includes a cylindrical ceramic permanent magnet defining plural polar regions facing the laminar core structure. By selectively supplying direct current to a coil, a resultant magnetic field interacts with one or more of the fields of the permanent magnet, causing the hub 14B to rotate. The Hall sensors enable direct current to be switched to the various coils of the stator assembly in proper time and sequence to result in a desired constant angular velocity of 4306 (±18) revolutions per minute.

A disk stack assembly 16 comprising two data storage disks 16A and 16B, a spacer 16C and a disk clamp 16D fit over the rotating disk hub 14B of the spindle motor 14. The disks 16A and 16B are preferably formed of a suitably flat and smooth substrate material, such as aluminum alloy or glass, are approximately 95 millimeters in diameter, and have major surfaces sputter-deposited with a suitable thin film magnetic material of high coercivity, such as 1300 Oersted. A carbon overcoat of less than 1.4 microinches protects the thin film magnetic layer from harm from contact with the head slider, etc.

A multiplicity of concentric data storage tracks are formed on each major surface, the track density being about 1930 tracks per inch, and there being a total of about 1840 data cylinders (defined as vertically aligned tracks on all four surfaces when the drive is horizontal as shown in FIG. 1). When formatted in plural track zones, e.g. 16 zones, each disk 16 is capable of storing approximately 120 megabytes of user data, 60 megabytes per surface.

Returning to FIG. 1, a cover 18 clamps down onto a gasket fitted over a continuous upper peripheral edge of an open top of the base casting assembly 12 and thereby encloses the interior space to seal it against unwanted intrusion of particulates or gaseous contaminants from the external ambient environment. A breather filter, not shown, may be provided to equalize pressures between the internal and external ambient atmospheres.

As shown in greater detail in FIGS. 2 and 3, a rotary actuator assembly 20 supports four vertically aligned data transducer heads 30A, 30B, 30C, and 30D formed as two-rail sliders and thin film electromagnetic record-/reproduction elements. The assembly 20 comprises four load beams and flexures 21A, 21B, 21C and 21D which are riveted, swaged, or otherwise suitably attached to a monolithic E-block 22. The actuator also includes a hub assembly 23 having bearings and a fixed central shaft 41 press fit into the base casting assembly 12. A flat coil 25 also is also molded integrally to the hub 23 and E-block 22. Opposed side segments of the coil 25 pass through intense magnetic fields established by permanent magnets 26. An arm 39 extending from the hub 23 supports a microlined scale 27 having radial microlines formed by photographic techniques in conventional fashion. A flexible plastic film circuit substrate 29 supports and connects a read preamplifier/-head selector/write driver integrated circuit 28 which is positioned as close as practical to the heads 30 in order to improve signal to noise ratios. An extension of the plastic circuit substrate 29 provides for external electrical connections thereto.

The heads 30A, 30B, 30C and 30D are of the thin-film type having e.g. 30 turns without centertap. The heads are formed on a 70% slider which is gimbal-mounted to a standard type 4 suspension providing e.g. 9.5 grams of preload. Primary pole width of each head is approximately 9.0 microns; pole thickness is approximately 3.2 microns, and gap length is approximately 0.4 microns.

An aerodynamically actuated actuator lock 32 is rotationally mounted to a vertical pin 33 pressed into the base casting assembly. This lock 32 releases the actuator 20 in response to airflow generated by rotation of the disks 16A and 16B; and, it is substantially as described in the referenced U.S. Pat. No. 5,005,089.

An optical encoder assembly 34 includes a flexible plastic substrate 36 and an encoder 38 comprising a light source and a plural cell, masked photodetector array which generates and puts out analog phases P1 and P2 which vary in intensity in function of angular displacement of the scale 27 relative to the encoder 38. An encoder in accordance with the teachings of the referenced U.S. Pat. No. 5,227,930 is presently preferred; however, the spacing between radial microlines is slightly greater, and eight track locations are defined around a single lissajous circle, by virtue of an increased analog to digital conversion resolution.

The plastic substrate 36 carries electronic circuitry related to supplying driving current to an LED light source and amplifying the electrical signals from the photodetector array. An extension 40 of the substrate 36 enables external connections to be made to the electronic circuitry thereof.

A faceplate 42 may be provided, as is sometimes conventional with small disk drives. A plastic foam sheet insulator 44 electrically isolates and separates a printed circuit board 46 from the bottom of the metal base casting assembly 12 to which the circuit board is mounted. The insulator 44 also acoustically isolates the head and disk assembly and dampens sound vibrations therein. Further details of the circuitry included on the circuit board 46 are shown in the drive block diagram of FIGS. 4A, 4B, 4C and 4D.

Drive Electronics, FIG. 4

With reference to the FIGS. 4A, 4B, 4C, 4D and 4E block diagram (hereinafter collectively "FIG. 4"), essentially there are only several discrete building blocks comprising the control electronics of the disk drive 10. These blocks include a thin film read/write circuit 50 carried on the thin plastic film substrate 28 within the head and disk assembly, a read channel device 52, a programmable electronic filter 54, a programmable frequency synthesizer 56, a disk controller/sequencer/DMA cache controller 58, a servo control 60, a bus level interface 62, a cache RAM buffer 64, a programmed microcontroller 66, a program memory 68, an external RAM 70, a spindle motor controller 72 for controlling the spindle motor 14, and a snubber network 74. Discrete components include the motor snubber network 74, two PWM low pass filters 76 and 78 for converting pulse width modulation signals into analog signals, a power-on-reset circuit 80, and some discrete components 82 related to the motor controller 72, and discrete components 83 related to the read channel device 52. Also, the servo control block 60 includes the optical encoder electronics 36 contained within the head and disk assembly as shown in FIG. 1. All electrical elements other than the circuitry associated with the thin film read/write circuit 50 and the optical encoder electronics 36, are mounted on, and interconnected by, the multi-layer circuit board 46.

A main disk read/write control bus 84 extends from the microcontroller 66 throughout the FIG. 4 block diagram. A digital address/data/control bus 86 extends from the microcontroller 66 to the external ROM 68, external RAM 70, a microcontroller interface 196 of the disk controller/sequencer/DMA controller 58 and microcontroller interface 208 of the host bus interface circuit 62. The functional operations of the disk drive 10 are controlled by the embedded microcontroller 66, such as NEC type 78322, or equivalent. The microcontroller 66 includes a number of internal timers which are used to set up various time intervals related to disk drive operations, and also includes an internal analog to digital converter with a plurality of multiplexed inputs. A cache buffer data bus 88 extends between the cache buffer 64, the host interface 62 and a buffer controller portion 198 of the disk controller/sequencer/DMA controller block 58. A clock bus 90 extends from the frequency synthesizer 56 to the disk controller etc., block 58, the read channel device 52, the microcontroller 66, and the motor controller 72. A cache memory address bus 92 extends from the buffer controller 198 of the disk controller block 58 to the cache buffer 64. An internal control bus 94 extends throughout the read channel device 52.

Most preferably, the thin film read/write circuit 50 is a type SSI 32R4610/4611 2 or 4-channel thin film read/write device, made by Silicon Systems, Inc., or equivalent. This particular device is designed for use with non-center-tapped thin film heads, such as the heads 30.

Most preferably, the filter 54 is implemented as a type 32F8011 programmable electronic filter, made by Silicon Systems, Inc., or equivalent.

In summary, the serial data received from the microcontroller 66 via the serial interface 168 enables the device 52 to control center frequency of the PLL, gain of the PLL, time constant of a low pass filter in each of the track and hold circuits 184 and 186, write precompensation adjustment, servo demodulator gain, and input attenuation for the AGC circuit 116. The serial data also sets up the frequency of the synthesizer 56 in relation to the data zone being accessed.

Turning now to FIG. 4B, the disk controller device 58 includes a sequencer 190, the 1, 7 RLL encoder/decoder, the servo interface circuit 194, a microcontroller interface circuit 196 and the cache buffer controller circuit 198.

The sequencer 190 is highly programmable, and includes a writeable control store having the features described in the incorporated co-pending U.S. patent application Ser. No. 07/710,861 filed on Jun. 4, 1991, reference to which is made for further particulars. The sequencer 190 further includes an on-the-fly ECC circuit implementing a 96 bit interleaved Reed-Solomon ECC with two cross check bytes, as described in the incorporated U.S. Pat. No. 5,241,546 filed on Feb. 1, 1991, now U.S. Pat. No. 5,241,546, reference to which is made for further particulars. The sequencer 190 also includes a 1, 7 RLL fault tolerant address mark decoder as described in the incorporated U.S. Pat. No. 5,231,545, filed on Jun. 4, 1991, now U.S. Pat. No. 5,231,545, reference to which is made for further particulars. The address mark circuitry of the sequencer 190 generates address marks by altering a correctly encoded data group into a unique pattern, which would not have been encoded by a proper encoding operation. During data read operations, these unique patterns are detected and checked by the address mark decode circuitry so as to identify e.g. the beginning of a data sector ID field, for example.

The data sequencer 190 controls disk formatting by assigning specific byte values to be written into each ID field as the disk 16 is being formatted. It controls such sector fields as ID Sync, ID address mark, ID data, ID data error detection code, ID postamble, data sync (following write splice) data address mark, data, data ECC syndrome remainder bytes, and data postamble. Data rates up to 30 MBits per second are supported.

The 1, 7 RLL encoder/decoder 192 provides for translation between 1, 7 run length limited encoded data (format written to and read from the disk 16) and non-return-to-zero (NRZ) decoded data, which is used within the sequencer 190 to frame data words for passage via the buffer control 198 to the cache buffer 64. NRZ data bits are grouped as pairs and encoded as three bits or cells by the encoder/decoder 192. While three cells are required, in accordance with the 1, 7 RLL convention, at least the middle cell is a zero or non-flux transition. The net result is that the data cells may be packed more closely than otherwise, meaning that greater data storage densities are achieved, in accordance with a four to three ratio. The encoder/decoder 192 is substantially as described in the incorporated U.S. Pat. No. 4,675,652, reference to which is made for further particulars.

Spindle Motor Controller

Figure 4C:
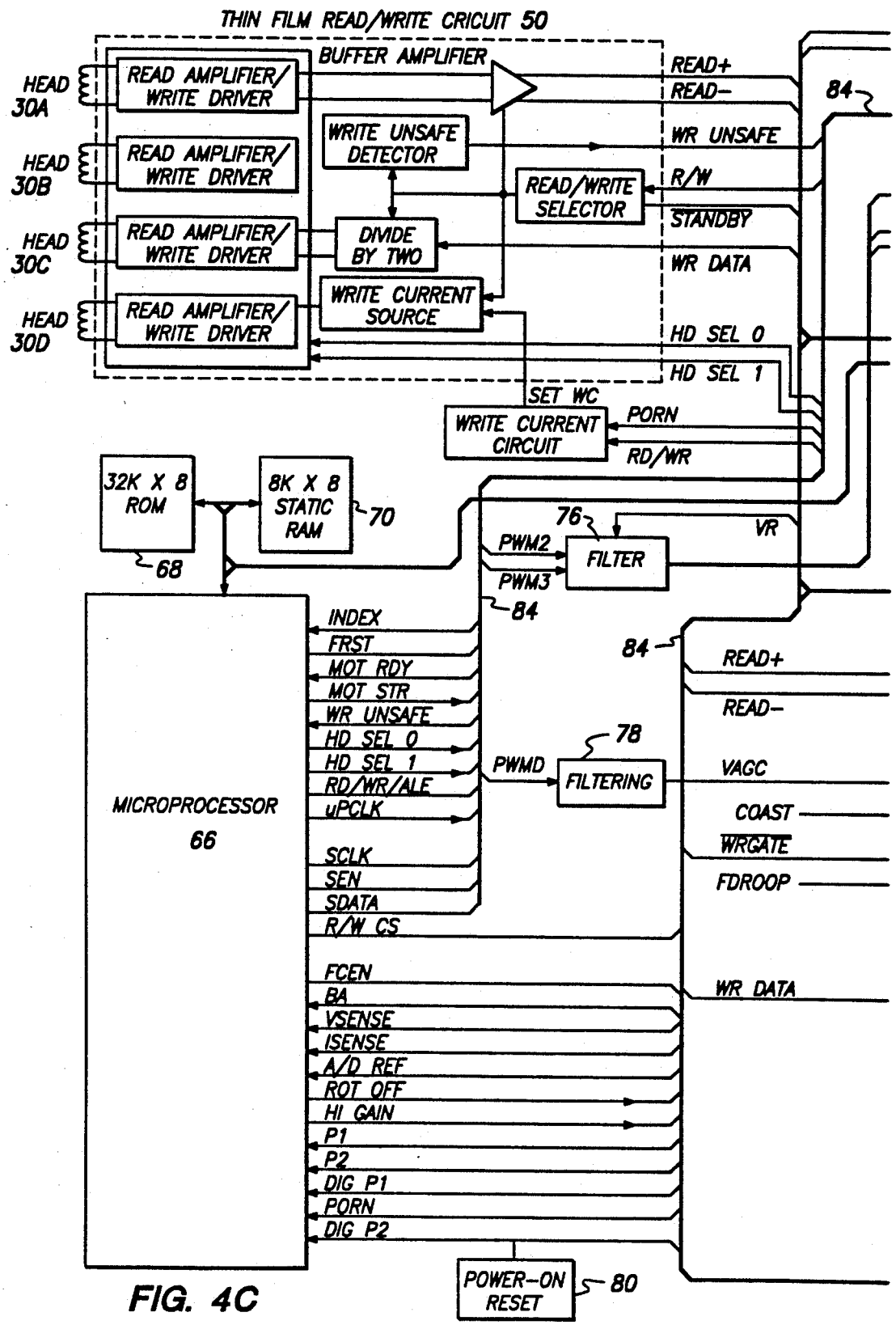
Figure 4D:
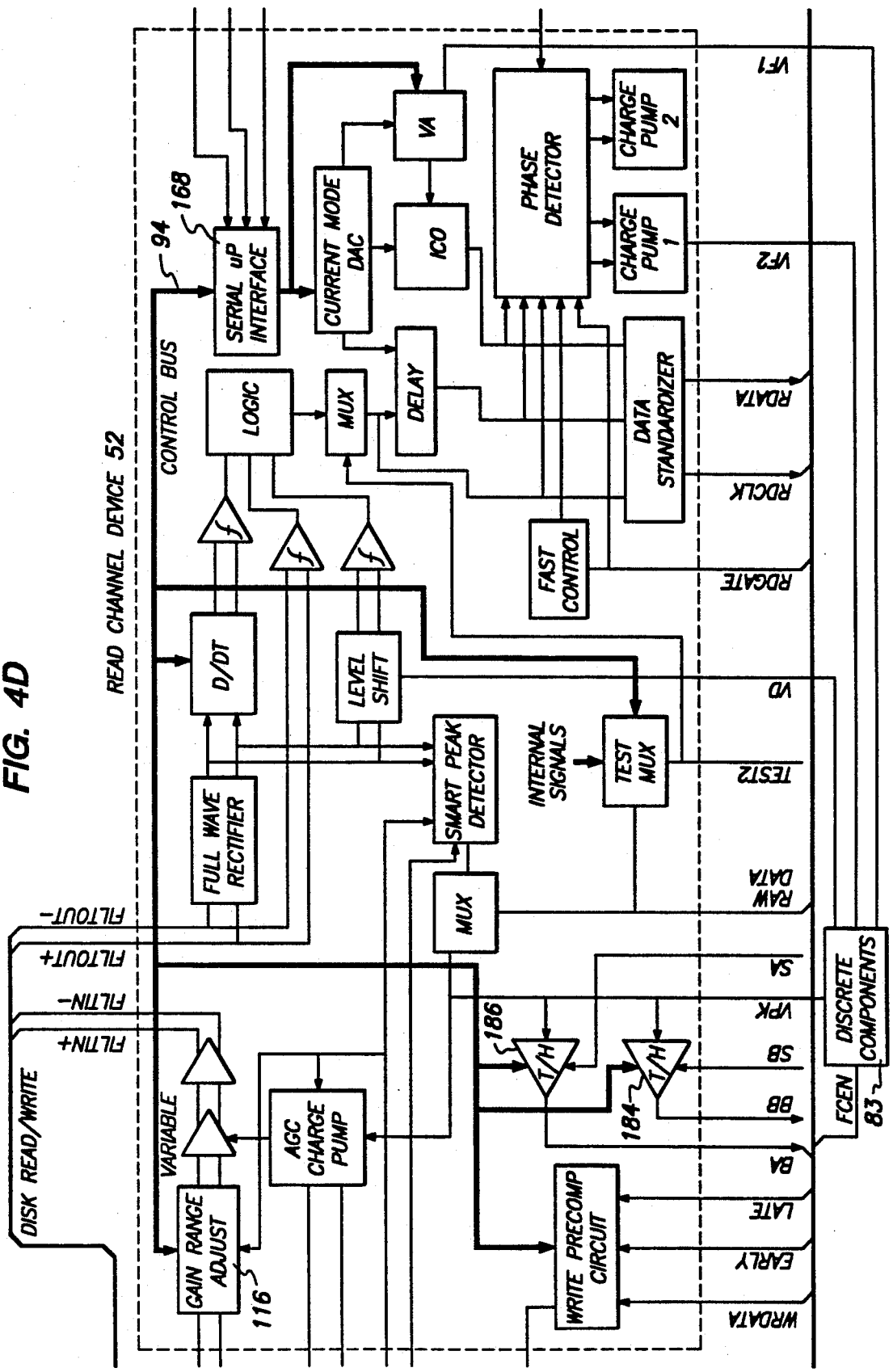
Figure 4E:
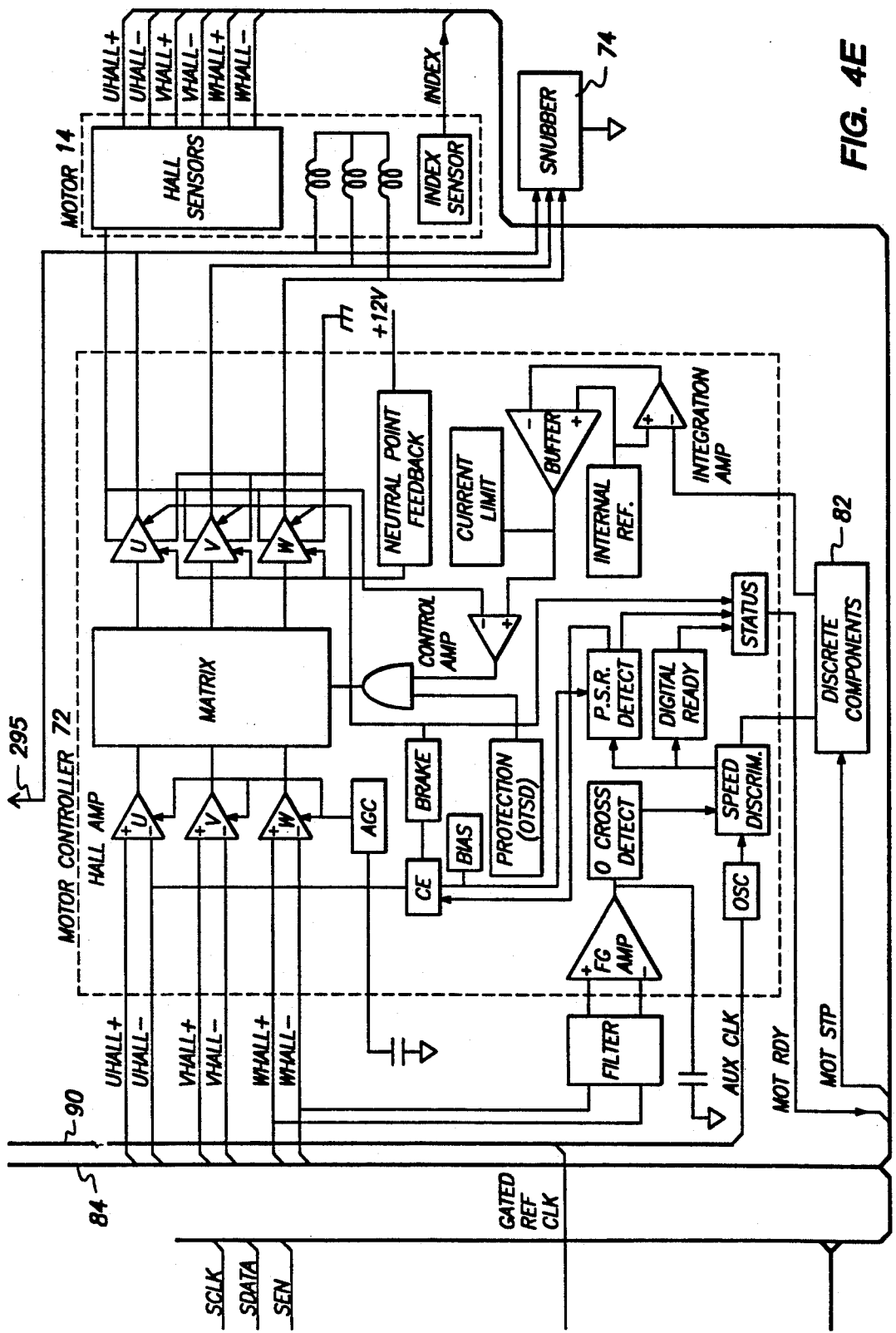

Turning now to FIG. 4D, the spindle motor controller 72 is essentially self-contained within a single conventional motor driver integrated circuit, such as type HA13746, made by Hitachi, or equivalent. This circuit 72 implements a phase locked loop speed detector with an internal linear lead/lag compensation loop.

Bus Level Interface 62, FIG. 4B

Returning to FIG. 4B, the cache buffer controller circuit 198 transfers blocks of data between the sequencer 190 and the cache memory array 64. The controller 198 also manages the transfer of data between the cache buffer 64 and the host interface 62. The management of these data transfers is achieved by virtue of two independently controlled direct memory channels. A third channel enables the microcontroller 66 to access the cache buffer 64, e.g. for error correction of a data block on the fly; and, a fourth channel supports refresh of the storage cells of the dynamic RAM memory comprising the cache buffer 64. An address generator within the buffer controller 198 generates and puts out addresses to the buffer memory 64 via the address bus 92 during block transfers between the buffer memory 64 and the host interface 62, and during block transfers between the sequencer 190 and the buffer memory 64. The memory controller 198 thus includes an arbitration circuit for arbitrating requests from the disk sequencer channel, the host interface channel, the microcontroller channel, and the DRAM refresh channel.

The host interface device 62 includes a cache buffer interface 200 which sends and receives data blocks and command values from the host via the block bus 88. A 7 word by 16 bit per word FIFO 202 buffers data between the cache buffer interface 200 and a host interface 204. A series of command registers 206 are directly accessible by the microcontroller 66 via a microcontroller interface 208 and the multiplexed data/address and control bus 86. The microcontroller 66 sends and receives information to and from the interface device 62 by strobing an address on the falling edge of an address latch enable (ALE) control line. If the address line selects the interface device 62, the microcontroller 66 transfers data over the bus 86 on the rising edge of a write control line (WR−) or a rising edge of a read control line (RD−). The command registers 206 may thus be directly read from or written to by the microcontroller 66. In this manner, commands and status values may be passed directly to the host via the host interface 204.

A host bus 205 implements a conventional integrated drive electronics ("IDE") bus structure. In this regard, there are eight command block registers 206 including data port, error, sector count, sector number, cylinder (low byte), cylinder (high byte) drive/head, and status/command register. These command block registers support the following commands: RECALIBRATE, READ, READ LONG, WRITE, WRITE LONG, READ VERIFY, FORMAT TRACK, SEEK, EXECUTE DIAGNOSTICS, INITIALIZE DRIVE PARAMETERS, READ MULTIPLE, WRITE MULTIPLE, SET MULTIPLE MODE, READ DMA, WRITE DMA, READ SECTOR BUFFER, WRITE SECTOR BUFFER, IDENTIFY DRIVE, READ DEFECT LIST, READ CONFIGURATION, SET CONFIGURATION.

Two control block registers are provided: alternate status register which contains the same information as the status register in the command block set, and a device control register which enables the host to set a software reset bit for resetting the drive, and a drive interrupt enable bit which enables the host interrupt signal INTRQ to be passed through a tri-state buffer back to the host.

The interface circuit 62 writes data blocks to, or reads data blocks from the cache buffer 64 over eight data lines included within the bus 88. This data transfer is facilitated by the FIFO 202. The buffer controller 198 actually controls the transfer in conjunction with generation of buffer addresses. For page mode operations, the data transfer rate enables the interface device 62 to communicate over the IDE bus structure with a host at a sustained data transfer rate of 5.0 MBytes per second over the duration of a sector without requiring use of the I/O READY control signal. This sustained 5.0 Megabyte rate occurs with transfers to and from the disk at the maximum data rate of 30 Megabits per second, dynamic memory refresh, and the microcontroller channel being in use as in the case of an on the fly error correction process with a stored block. In this regard internal data transfers are at a 10 MByte per second rate. If the I/O READY control line in use bursts of data may be transferred to the host at a rate up to 10 Megabytes per second as in the case of a cache hit.

Direct memory access transfers are supported by the interface circuit 62 for host computing systems equipped to handle DMA to disk operations. Also, an auto task file update function is provided for automatically updating the cylinder, head and sector registers after each block transfer, thereby enabling automatic readout of multiple blocks of data stored in the cache buffer 64 without intervention of the drive microcontroller after each block is transferred. Similarly, an automatic write-to-cache feature may be provided whereby data blocks written to the cache buffer 64 via the interface circuit 62 result in a "written to disk" status value being returned to the host, even though the drive 10 has not yet finished the actual transfer from the buffer 64 to the appropriate data block locations on a selected data surface.

Figure 5:
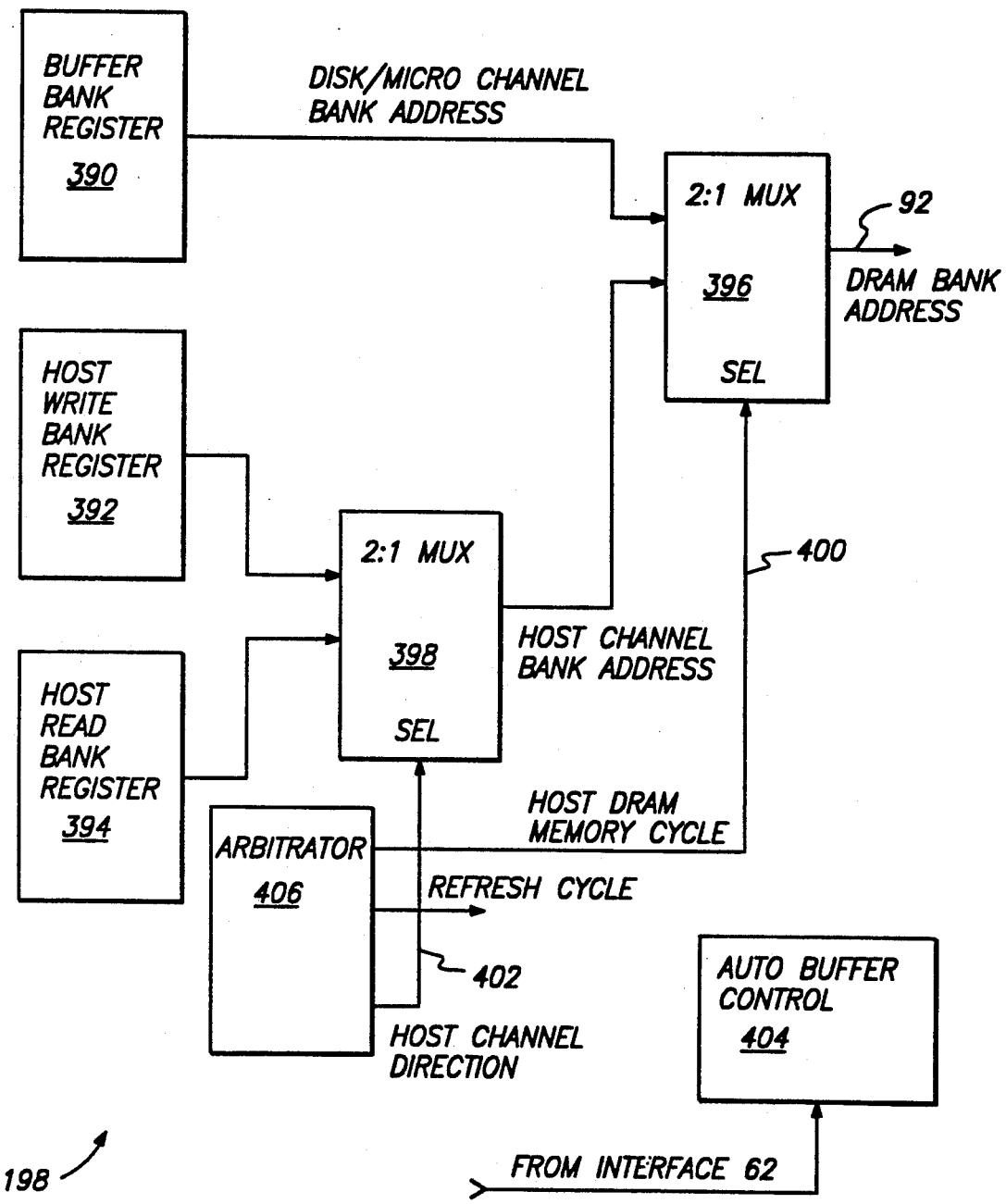
FIG. 5 is a simplified block diagram of bank address registers and related controls found within a cache buffer controller of the FIG. 1 disk drive.

In order to support auto read and auto write functions, the buffer memory 64 is divided into four 64 Kilobyte banks or segments. Each segment wraps around to zero when its 64K boundary is reached. With multiple banks, substantially simultaneous transfers between disk and cache, and between host and cache can be carried out. FIG. 5 illustrates in a simplified fashion the bank addressing function carried out within the memory controller 198. A buffer bank register 390 holds the address including bank number of the cache bank presently involved in disk or microcontroller transactions (e.g., the microcontroller 66 may be performing ECC corrections within a block of data before it becomes ready for transfer to the host). A host write bank register 392 holds the address for host data block writes to a cache segment, and a host read bank register 394 holds the address for host data block reads from a cache segment. A first multiplexer 396 switches between the disk/microcontroller bank address supplied from the buffer bank register 390 and a host channel bank address supplied from a second multiplexer 398 in accordance with a host DRAM memory cycle control supplied on a control line 400.

During a host memory cycle, the host bank address is supplied to address the buffer memory 64 via the address bus 92. Otherwise, the disk/micro channel bank address is actively addressing the cache memory. An arbitrator 406 within the DRAM memory controller 198 controls the granting of either a host memory cycle, or a non-host memory cycle which may be a disk cycle, a refresh cycle or a microcontroller cycle. A host channel direction signal on a line 402 governs operation of the multiplexer 398, depending upon the data direction between the host and the disk subsystem 10.

For an auto write operation, an auto write starting address is automatically loaded into the host write bank address register 392. A particular bank is selected as the host write bank, and throughout the auto write transaction, that bank remains the selected bank. During the auto write procedure, a bit control line from the interface circuit 62 pulses the automatic control circuitry 404, and the write pointers are automatically incremented for incoming block.

For an auto read operation, a read bank is selected and the automatic buffer control circuitry 404 automatically advances the read pointers as blocks are read out. During an auto read, the microcontroller 66 is monitoring the cylinder, head and sector registers to which it shares dual access with the host. If calls are repeatedly made to the same logical block address, a special operational mode may be invoked under firmware control which causes the automatic control circuitry 404 to reset the read bank register pointers to point to the address of the same block after each read. In this repeat mode, the automatic control circuitry 404 reloads the fixed address for every block read. When a new logical block address (cylinder, head, sector), the first mode is invoked, and a sequential readout from the cache 64 is then automatically invoked.

Alteratively, a SCSI interface circuit may be employed within the disk drive subsystem. One example of a digital SCSI interface is given in commonly assigned, copending U.S. patent application Ser. No. 07/710,171, filed on Jun. 4, 1991 and entitled "Miniature Fixed Disk Drive", the disclosure of which is hereby incorporated herein by reference.

A microfiche appendix accompanying the patent application leading to this patent sets forth a hexadecimal program listing for the microcontroller 66, as well as specifications for the disk controller/sequencer/DMA control block ASIC (code-named "Metro"), specifications for the AT interface ASIC (code-named "Tahoe"), and five sheets of electrical schematics for the electronics and connections of the printed circuit board 46. Reference is made to these materials for further information.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

We claim:

1. A disk drive including a head and disk assembly means having a rotating data storage disk for storing blocks of data, voice coil actuator means for positioning at least one data transducer head means in order to store and retrieve said blocks of data to and from the disk, and spindle motor means for rotating the disk; the drive further comprising a circuit board attached to the head and disk assembly means and including:

head positioner servo means for providing control signals to said voice coil actuator means, read and write electronic channel means for formatting said blocks from digital to analog signal format, sequencing means for controlling sequencing of said blocks to and from the disk, cache buffer memory means for temporarily storing said blocks of data, memory controller means for addressing said cache buffer memory means, digital interface means for connecting a digital signal bus carrying data and control values to and from a host computing system, and single embedded microcontroller means for directly controlling said read and write electronic channel means, said sequencing means, said memory controller means, said interface means, and said head positioner servo means, said cache buffer memory means being arranged as a plurality of segments of memory, said memory controller means for defining a plurality of channels including a host data channel, and a disk and microcontroller data channel, and including multiplexing means for switching cache memory segment addresses between predetermined segments in response to a particular one of said channels being presently active such that data can be transferred over said host channel to a predetermined host segment while data is being transferred over said drive channel on another predetermined drive segment.

2. The disk drive architecture set forth in claim 1 wherein said cache buffer memory means comprises dynamic random access memory means, and wherein said memory controller means defines a refresh channel for refreshing each of said segments of said cache memory means.

3. The disk drive architecture set forth in claim 1 wherein said interface means and said memory controller means have automatic sequential block transfer means for enabling the host computing system to read multiple blocks of data from a said segment, and to write multiple blocks of data to a said segment, without invention on a block by block bias by the embedded microcontroller means.

4. The disk drive architecture set forth in claim 1 wherein the memory controller means includes:

disk/microcontroller buffer bank register means for holding the segment address of a first cache segment of said cache buffer means presently involved in one of a disk data transfer and microcontroller access transaction involving the said first segment;

host write-to-bank register means for holding the segment address of a second cache segment of said cache buffer means presently involved in transfer of user data from the host data channel to the said second segment, and host read-from-bank register means for holding the segment address of a third cache segment of said cache buffer means presently involved in transfer of user data from the third segment to the host, and wherein the multiplexing means selects and puts out an address from one of said register means in accordance with a host channel direction control and a host cache buffer memory cycle control generated by the memory controller means.

* * * * *